United States Patent [19]

Hirano

[11] 4,399,380

[45] Aug. 16, 1983

[54] AIR COOLED WIPER MOTOR

[75] Inventor: Koki Hirano, Fujisawa, Japan

[73] Assignee: Jidosha Denki Kogyo Kabushiki Kaisha, Kanagawa, Japan

[21] Appl. No.: 291,909

[22] Filed: Aug. 11, 1981

[30] Foreign Application Priority Data

Aug. 29, 1980 [JP] Japan ............... 55/121824[U]
Aug. 29, 1980 [JP] Japan ............... 55/121825[U]

[51] Int. Cl.³ ............................................. H02K 9/06
[52] U.S. Cl. ................................. 310/62; 310/64; 310/83; 310/89; 15/250.3; 74/606 A; 165/47
[58] Field of Search ................. 310/58, 62, 63, 83, 310/89, 90, 52, 53, 59, 64, 65; 15/250.3; 74/606 A; 165/47

[56] References Cited

U.S. PATENT DOCUMENTS

| | | | |
|---|---|---|---|
| 2,560,465 | 7/1951 | McVicker | 310/83 UX |
| 2,639,394 | 5/1953 | Douglas | 310/83 |
| 2,822,122 | 2/1958 | Cole | 310/63 |
| 3,143,897 | 8/1964 | Kohn | 310/89 |
| 3,441,757 | 4/1969 | Erickson | 310/64 |
| 3,719,843 | 3/1973 | Dochterman | 310/62 |
| 4,227,104 | 10/1980 | Hamman | 310/90 |

FOREIGN PATENT DOCUMENTS 2372998 12/1976 France ........................ 310/83
566498 9/1975 Switzerland ................. 310/83

Primary Examiner—R. Skudy
Attorney, Agent, or Firm—Sughrue, Mion, Zinn, Macpeak and Seas

[57] ABSTRACT

An air-cooled wiper motor having self-cooling fan for use in vehicles is disclosed. The wiper motor comprises a motor yoke, a rotatable armature shaft provided in the yoke, a reduction gear mechanism provided at one end of the armature shaft, a vehicle wiper blade connected to the armature shaft through the reduction gear mechanism and being swung reciprocally, a self-cooling fan provided to the other projected end of the armature shaft, a fan cover provided around the fan for forming a ventilation duct having a width not exceeding an outer diameter of the yoke in one diametrical direction between the cover and the outer diameter portion of the yoke, and a bearing having an inner race secured to the armature shaft and an outer race secured to a gear housing of the reduction gear mechanism thereby to hold thrust loads in both directions received by the armature shaft.

6 Claims, 5 Drawing Figures

AIR COOLED WIPER MOTOR

BACKGROUND OF THE INVENTION

The present invention relates to a wiper motor for vehicles, more particularly to an air-cooled wiper motor provided with a self-cooling fan.

Recently, parts for vehicles, particularly for automobiles are tried to be light in weight viewed from economy of fuel, material or the like, while a wiper blade tends to be large for the purpose of obtaining the good field of vision during driving. Therefore, the power output of a wiper motor is getting larger, and the wiper motor becomes inevitably large, but such phenomenon is against a tendency of light weight.

On the other hand, as means for making the motor light or increasing only the power output with the same motor, it has been known to cool the motor with a fan. In this case, the fan is roughly divided into the following types, that is, an open type (which passes a cooling air into the motor) and a totally-enclosed type (which passes a cooling air to the outside of the sealed motor), according to use. Among these types, in case of the totally-enclosed type, in general, a ventilation cover is concentrically provided around the outer periphery of a motor to form an annular ventilation duct between the ventilation cover and the outer periphery of the motor, so that an outer diameter of the motor inclusive of the ventilation cover becomes large as a whole. In recent automobiles, piping for a brake master, cable for an automatic speed control device or the like is arranged close to a wiper motor (refer to symbol A in FIG. 2), so that it is necessary to secure the wiper motor in a fairly narrow space, and thus it is difficult to make an outer diameter of the wiper motor large in order to form a vantilation duct for cooling the wiper motor.

While an increase of the power output of the wiper motor is tried by securing a self-cooling fan to the armature shaft of the wiper motor without enlarging the wiper motor itself.

On the other hand, in the conventional wiper motor, a deceleration gear mechanism portion of a worm is provided at one end of the armature shaft, a wiper blade is reciprocally swung, and a thrust load received by the armature shaft by the deceleration gear mechanism portion is supported on the other end of the armature shaft. However, because of an increased power output of the wiper motor, when securing the self-cooling fan on the other end of the armature shaft, the construction for supporting the thrust load becomes complicated in the conventional case and assembling workability becomes lowered.

SUMMARY OF THE INVENTION

An object of the present invention is to eliminate the above described disadvantages of the conventional wiper motor.

Another object of the present invention is to provide an air-cooled wiper motor which can be secured to a narrow portion of the vehicle and can increase the power output in the same motor.

A further object of the present invention is to provide an air-cooled wiper motor, which can increase the power output without enlarging the wiper motor itself, and can well support thrust load received by an armature shaft in both directions.

According to the present invention there is provided an air-cooled wiper motor comprising a motor yoke, an armature body of a revolving type provided therein, a rotatable armature shaft secured to the armature body, a reduction gear mechanism provided at one end of the armature shaft and connected to a vehicle wiper blade, a self-cooling fan provided to the other projected end of the armature shaft, and a fan cover provided around the fan for forming a ventilation duct having a width exceeding an outer diameter of the yoke in one diametrical direction between the cover and the outer diameter portion of the yoke. The wiper motor further comprises a bearing having an inner race secured to the armature shaft and an outer race secured to a gear housing of the reduction gear mechanism thereby to hold thrust loads in both directions received by the armature shaft. The fan cover has at least one portion contacted to the yoke for reinforcing the fan cover in the ventilation duct. The reduction gear mechanism comprises a worm integrally provided to the one end of the armature shaft, and a worm wheel secured to a reduction shaft and being meshed with the worm. The reduction gear mechanism comprises two worms integrally provided to the one end of the armature shaft, the gear threading directions thereof being opposite to each other on the same axis, and two worm wheels provided at both sides of the worm axis and being meshed with the worms thereby to rotate a wiper drive gear in the same direction. The worm comprises a bearing secured to the gear housing and a thrust screw for controlling a thrust gap of the armature shaft.

DESCRIPTION OF THE PREFERRED EMBODIMENT

Figure 1:
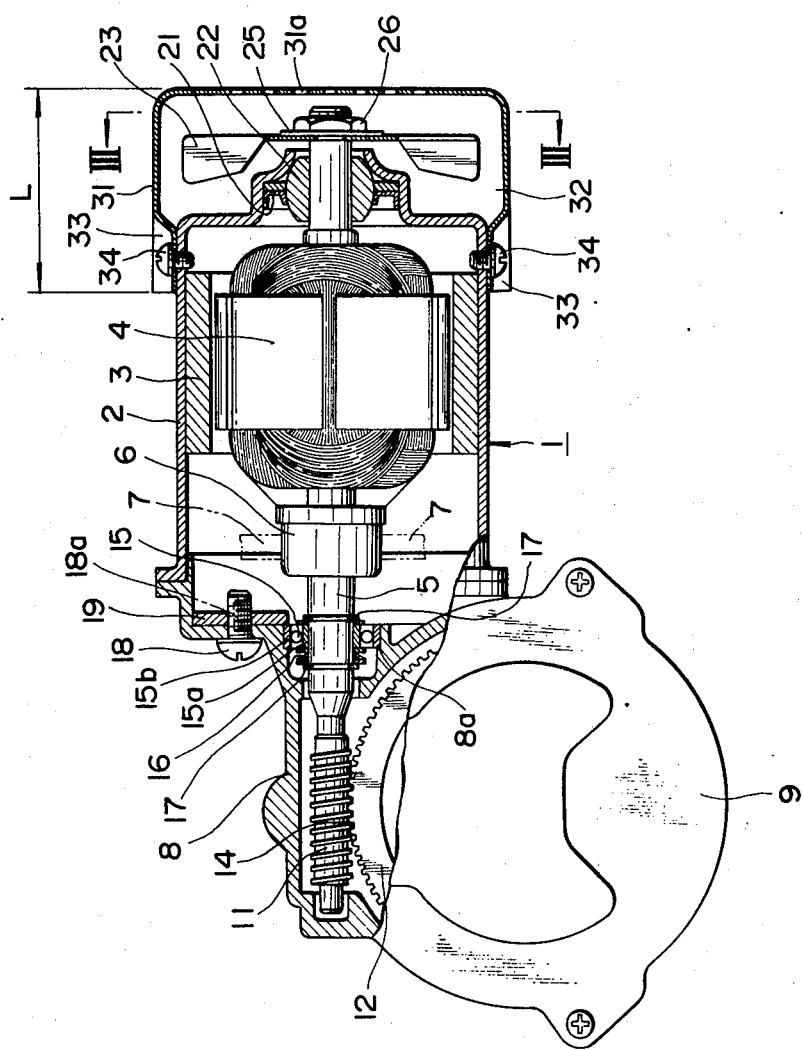
FIG. 1 is an elevational view in section showing one embodiment of an air-cooled wiper motor according to the present invention.
Figure 2:
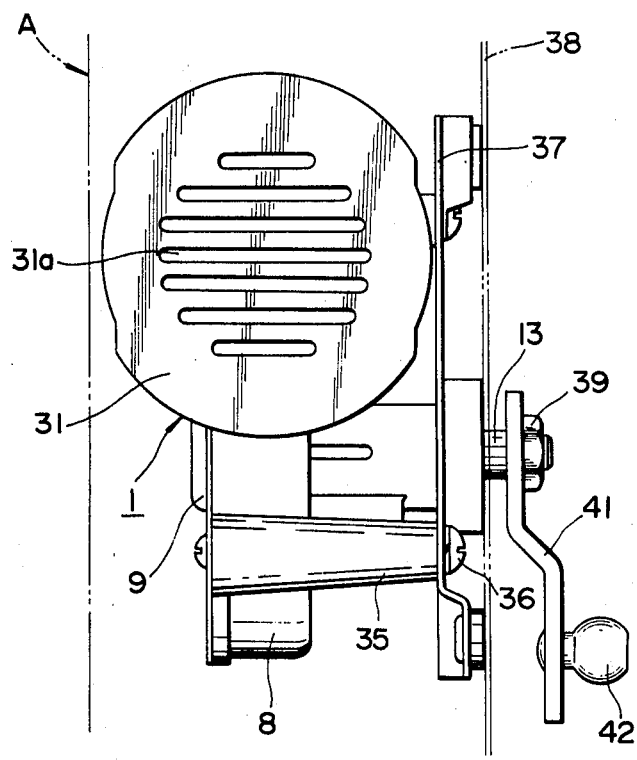
FIG. 2 is a right side view of the wiper motor shown in FIG. 1.
Figure 3:
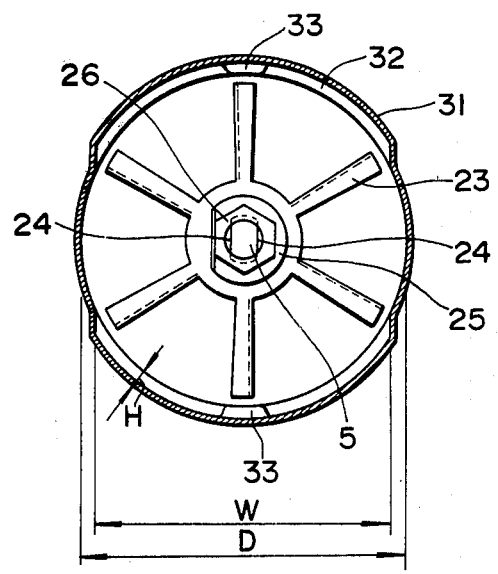
FIG. 3 is a cross-sectional view taken along the line III—III of FIG. 1.

Referring now to the drawing, wherein same reference characters designate same or corresponding parts throughout the several views, FIGS. 1 to 3 show an embodiment of an air-cooled wiper motor according to the present invention. As shown in FIG. 1, a wiper motor 1 comprises a field magnet 3 fixed to the inner wall of a totally enclosed motor yoke 2, without any ventilation openings, an armature 4 and an armature shaft 5 being rotatable in the field magnet 3, a commutator 6 secured to the armature shaft 5, and carbon brushes 7 contacted to the commutator 6. The carbon brushes 7 are secured to the portion where the yoke 2 is engaged with a gear housing 8. Reference numeral 9 is a cover of the gear housing 8.

One end of the armature shaft 5 is integrally provided with a worm 11, and a worm wheel 12 meshed with the worm 11 is fixed to a reduction shaft 13 (refer to FIG. 2) to freely ratate it in the gear housing 8, thereby to form a reduction gear mechanism portion 14. The reduction gear mechanism portion 14 is not limited to the above construction but may use spur gear, helical gear, bevel gear and other members.

An inner race 15a of a ball bearing 15 is inserted between the commutator 6 of the armature shaft 5 and the worm 11, and the inner race 15a is fixed to opposite snap ring 17 through a corrugated sheet washer 16 sandwiched by two plain washers, while an outer race 15b of the ball bearing 15 is pressed and inserted into a step portion 8a formed in the gear housing 8. A keep plate 19 fitted on a deformed portion 18a of a set-screw 18 is moved to a side wall of the outer race 15b by rotating the set-screw 18 so as to prevent the ball bearing 15 from slipping off.

The other end of the armature shaft 15 is extended through an oil retainning bearing 22 held by a bearing holder member 21 and projected from the yoke 2 to fix a self-cooling fan 23 to this end portion. In this case, a flat portion 24 is provided in the armature shaft 5, a washer 25 having a hole fittable to the flat portion 24 is fitted on the flat portion 24, and then a nut 26 is fastened to the flat portion 24, and a part of the washer 25 is, thereafter, bent to the side surface of the nut 26 to form a locking.

A fan cover 31 having a number of air suction holes 31a is provided around the self-cooling fan 23 to form a pair of ventilation ducts 32 between the outer diameter portion of the yoke 2 and the fan cover 31. The shape of the fan cover 31, as shown in FIG. 3, is so formed that the ventilation duct 32 has a width W not exceeding an outer diameter D of the yoke 2 and an air amount necessary for cooling can be positively obtained by a height H of the ventilation duct 32. Moreover, a length L of the fan cover 31 is so determined as to obtain the strength necessary enough to send air along the outer periphery of the yoke 2 thereby to prevent the weight from increasing. Furthermore, in the ventilation duct 32 of the fan cover 31 there is provided at least one portion 33 contacted closely to the yoke 2 which is used for reinforcing the fan cover 31 and fixing it by a screw 34.

The wiper motor 1 according to the above construction is secured to an inner wall 38 of a vehicle body through a fitting leg 35 of the gear housing 8, a screw 36, and a bracket 37 or the like, while rotation of an arm 41 fixed to the reduction shaft 13 with the use of a nut 39 is changed to reciprocal swing of a wiper blade (not shown) through a ball joint 42.

Thus, according to the above embodiment, the width W of the ventilation duct 32 does not exceed the outer diameter D of the yoke 2, the air amount necessary for cooling is positively obtained by the height H of the ventilation duct 32, and the length L of the fan cover 31 is limited to the least necessary, so that the power output of the wiper motor 1 can be increased without increasing size and weight thereof, it can be secured to a narrow portion in the same manner as in the conventional one, and thrust loads in both directions received by the armature shaft 5 can sufficiently be supported by the ball bearing 15, so that any troublesome work such as thrust adjusting or the like can be eliminated.

Figure 4:
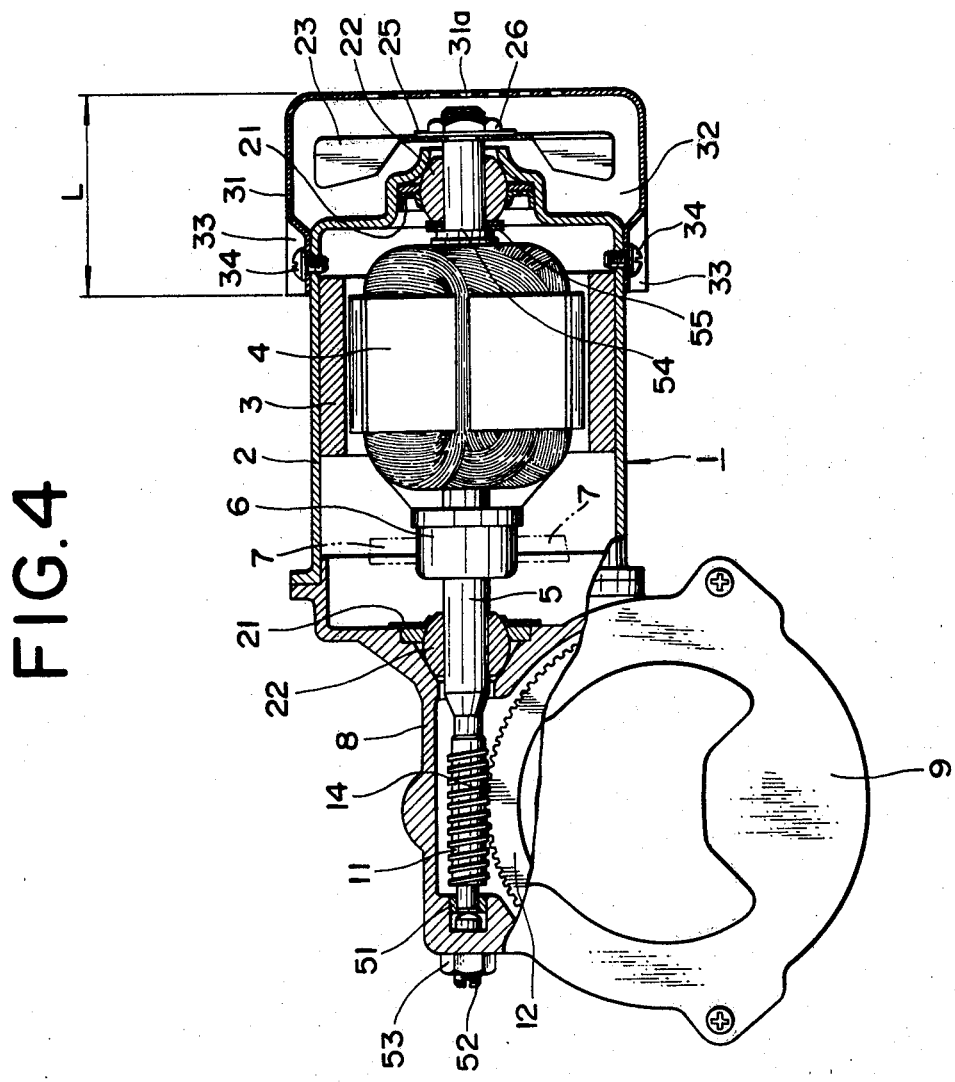
FIG. 4 is an elevational view in section showing another embodiment of an air-cooled wiper motor according to the present invention.

FIG. 4 shows another embodiment of the air-cooled wiper motor according to the present invention. In this embodiment, the end portion of the armature shaft 5 placed at the side of the gear housing 8 is also supported by the oil retaining bearing 22, which is held by the bearing holder member 21. Moreover, one end portion of the worm 11 opposite to the armature shaft 5 is supported by a bearing 51 so as to prevent the worm 11 from bending, and then a thrust gap of the armature shaft 5 is adjusted by a thrust screw 52. The thrust screw 52 is fixed by a nut 53. The other end portion of the armature shaft 5 is provided with a step portion 54, and a washer 55 is inserted between the oil retaining bearing 22 and the step portion 54.

Thus, according to the embodiment shown in FIG. 4, in addition to an effect based on the fan cover 31 in the above embodiment, since the worm 11 is prevented from bending by the bearing 51, irrespective to increase or decrease of a load, the worm 11 and the worm wheel 12 are constantly meshed with each other, so that the efficient reduction gear mechanism portion 14 can be obtained.

Figure 5:
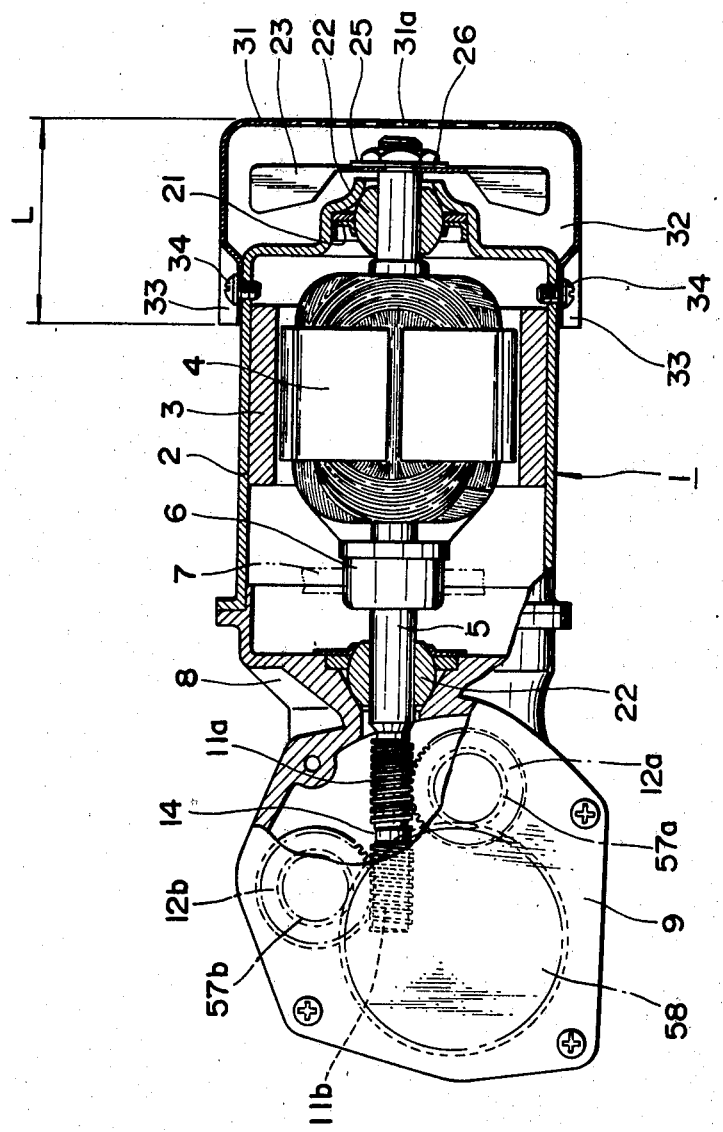
FIG. 5 is an elevational view in section showing a further embodiment of an air-cooled wiper motor according to the present invention.

FIG. 5 shows a further embodiment of the air-cooled wiper motor according to the present invention. In this embodiment, two worms 11a and 11b are integrally provided to one end of the armature shaft 5. In this case, gear threading directions of the worms 11a and 11b are opposite to each other on the same axis. Moreover, two worm wheels 12a and 12b meshed with the worms 11a and 11b, respectively, are integrally provided with pinions 57a and 57b, respectively, to mesh with a gear 58 thereby to rotate it in the same direction. The gear 58 is fixed to the reduction shaft 13, and the oil retaining bearing 22 is used at the end portion of the armature shaft 5 placed at the side of the gear housing 8. The other construction thereof is the same as in the case shown in FIG. 1.

According to the embodiment shown in FIG. 5, therefore, in addition to an effect based on the fan cover 31 in the above embodiment, since the gear threading directions of the worms 11a and 11b are opposite to each other, the thrust loads received by the armature shaft 5 are cancelled with each other, so that any troublesome thrust adjusting work or the like becomes unnecessary.

As described above, according to the present invention, the width W of the ventilation duct formed between the fan cover and the outer diameter of the yoke does not exceed the outer diameter D of the yoke, and an air amount necessary for cooling is positively obtained by the height H of the ventilation duct, so that the power output of the wiper motor can be increased largely without increasing size and weight thereof and the wiper motor can easily be secured to a narrow portion of the vehicle in the same manner as in the conventional one. Moreover, the thrust load received by the armature shaft in both directions can be held by the bearing, so that it is not necessary to employ any complicated construction for holding the thrust load received by the armature shaft as before.

What is claimed is:

1. An air-cooled wiper motor comprising a motor yoke of the totally enclosed without any ventilation openings, an armature body of a revolving type provided therein, a rotatable armature shaft secured to the armature body, a reduction gear mechanism provided at one end of the armature shaft and connected to a vehicle wiper blade, a self-cooling fan provided to the other projected end of the armature fan provided to the other projected end of the armature shaft, and a fan cover provded around the fan for forming a pair of ventilation ducts between the cover and two diametrically opposed outer surface portions of the yoke for directing cooling air over the outer surface of the yoke parallel to said armature shaft, said ducts each having a limited width not exceeding the outer diameter of the yoke.

2. An air-cooled wiper motor as claimed in claim 1, further comprising a bearing having an inner race secured to the armature shaft and an outer race secured to a gear housing of the reduction gear mechanism thereby to hold thrust loads in both directions received by the armature shaft.

3. An air-cooled wiper motor as claimed in claim 1, wherein the fan cover has at least one portion contacted to the yoke for reinforcing the fan cover in the ventilation duct.

4. An air-cooled wiper motor as claimed in claim 1, wherein the reduction gear mechanism comprises a worm integrally provided to the one end of the armature shaft, and a worm wheel secured to a reduction shaft and being meshed with the worm.

5. An air-cooled wiper motor as claimed in claim 1, wherein the reduction gear mechanism comprises two worms integrally provided to the one end of the armature shaft, the gear threading directions thereof being opposite to each other on the same axis, and two worm wheels provided at both sides of the worm axis and being meshed with the worms thereby to rotate a wiper drive gear in the same direction.

6. An air-cooled wiper motor as claimed in claim 4, wherein the worm is supported at its end opposite to the armature shaft by a bearing secured to the gear housing and a thrust screw for controlling a thrust gap of the armature shaft.

* * * * *

UNITED STATES PATENT OFFICE
CERTIFICATE OF CORRECTION

Patent No. 4,399,380   Dated August 16, 1983

Inventor(s) Koki HIRANO

It is certified that error appears in the above-identified patent and that said Letters Patent are hereby corrected as shown below:

IN THE CLAIMS  Claim 1 should read:

1. An air-cooled wiper motor comprising a motor yoke of the totally enclosed waterproof type without any ventilation openings, an armature body of a revolving type provided therein, a rotatable armature shaft secured to the armature body, a reduction gear mechanism provided at one end of the armature shaft and connected to a vehicle wiper blade, a self-cooling fan provided to the other projected end of the armature shaft, and a fan cover provided around the fan for forming a pair of ventilation ducts between the cover and two diametrically opposed outer surface portions of the yoke for directing cooling air over the outer surface of the yoke parallel to said armature shaft, said ducts each having a limited width not exceeding the outer diameter of the yoke.

Signed and Sealed this

Twenty-sixth Day of June 1984

[SEAL]

Attest:

GERALD J. MOSSINGHOFF

Attesting Officer   Commissioner of Patents and Trademarks